(12) United States Patent
Aminaka (10) Patent No.: US 10,687,232 B2
(45) Date of Patent: Jun. 16, 2020

(54) CONTROL APPARATUS AND METHOD FOR INTER-TERMINAL DIRECT COMMUNICATION

(71) Applicant: NEC Corporation, Tokyo (JP)

(72) Inventor: Hiroaki Aminaka, Tokyo (JP)

(73) Assignee: NEC Corporation, Tokyo (JP)

( * ) Notice: Subject to any disclaimer, the term of this patent is extended or adjusted under 35 U.S.C. 154(b) by 182 days.

(21) Appl. No.: 15/514,760

(22) PCT Filed: Jul. 15, 2015

(86) PCT No.: PCT/JP2015/003570
§ 371 (c)(1),
(2) Date: Mar. 27, 2017

(87) PCT Pub. No.: WO2016/056152
PCT Pub. Date: Apr. 14, 2016

(65) Prior Publication Data
US 2017/0230847 A1    Aug. 10, 2017

(30) Foreign Application Priority Data

Oct. 7, 2014  (JP) .................. 2014-206190

(51) Int. Cl.
*H04L 12/26* (2006.01)
*H04W 24/04* (2009.01)
(Continued)

(52) U.S. Cl.
CPC ......... *H04W 24/04* (2013.01); *H04W 72/005* (2013.01); *H04W 72/048* (2013.01); *H04W 92/18* (2013.01); *H04W 88/06* (2013.01)

(58) Field of Classification Search
CPC . H04L 41/0654; H04L 45/28; H04L 41/0668; H04W 24/04; H04W 76/19
See application file for complete search history.

(56) References Cited

U.S. PATENT DOCUMENTS 9,591,652 B2 *  3/2017  Fujishiro ............. H04W 52/383
2012/0155410 A1    6/2012  Toskala
(Continued)

FOREIGN PATENT DOCUMENTS

CN    103686753 A    3/2014
CN    103843444 A    6/2014
(Continued)

OTHER PUBLICATIONS

3GPP TSG RAN WG1 Meeting #76 R1-140516, Prague, Czech Republic, Feb. 10-14, 2014 (Year: 2014).*
(Continued)

*Primary Examiner* — Atique Ahmed
(74) *Attorney, Agent, or Firm* — Wilmer Cutler Pickering Hale & Dorr LLP (57) ABSTRACT

A control apparatus (5) is adapted to allocate a dedicated radio resource to a plurality of radio terminals (1, 2) for Proximity Service (ProSe) communication (103) performed within a terminal group including the plurality of radio terminals (1, 2), and allocate a shared radio resource to the plurality of radio terminal (1, 2) for ProSe communication performed between a radio terminal (1, 2) belonging to the terminal group and a radio terminal that does not belong to the terminal group. This contributes, for example, to facilitating inter-terminal direct communication.

16 Claims, 10 Drawing Sheets

(51) Int. Cl.
*H04W 92/18* (2009.01)
*H04W 72/04* (2009.01)
*H04W 72/00* (2009.01)
*H04W 88/06* (2009.01)

(56) References Cited

U.S. PATENT DOCUMENTS

| | | | | |
|---|---|---|---|---|
| 2013/0064138 | A1* | 3/2013 | Hakola | H04L 67/16 370/255 |
| 2013/0287012 | A1* | 10/2013 | Pragada | H04W 76/25 370/338 |
| 2014/0094212 | A1* | 4/2014 | Ahn | H04W 4/70 455/517 |
| 2014/0198708 | A1* | 7/2014 | Lee | H04W 76/14 370/312 |
| 2014/0273943 | A1 | 9/2014 | Wu et al. | |
| 2015/0043545 | A1* | 2/2015 | Cheng | H04W 56/00 370/336 |
| 2015/0124775 | A1* | 5/2015 | Guo | H04W 8/005 370/331 |
| 2015/0351044 | A1* | 12/2015 | Boudreau | H04W 72/0473 370/329 |
| 2015/0382385 | A1* | 12/2015 | Cai | H04W 76/11 370/254 |
| 2016/0150503 | A1* | 5/2016 | Xu | H04W 72/04 370/330 |
| 2016/0255501 | A1* | 9/2016 | Van Phan | H04L 63/20 713/153 |
| 2016/0374105 | A1* | 12/2016 | Kalhan | H04W 72/1278 |

FOREIGN PATENT DOCUMENTS

| | | | |
|---|---|---|---|
| JP | 2012-531769 A | 12/2012 | |
| JP | 2013-229747 A | 11/2013 | |
| WO | WO-2011/000419 A1 | 1/2011 | |
| WO | WO-2013/128863 A1 | 9/2013 | |
| WO | WO-2013/161136 A1 | 10/2013 | |
| WO | WO-2014/075299 A1 | 5/2014 | |

OTHER PUBLICATIONS

International Search Report corresponding to PCT/JP2015/003570, dated Oct. 6, 2015 (1 page).
3GPP TS 22.278 V12.4.0 (Sep. 2013), "3rd Generation Partnership Project; Technical Specification Group Services and System Aspects; Service requirements for the Evolved Packet System (EPS) (Release 12)", Sep. 2013 (45 pages).
3GPP TS 23.303 V12.1.0 (Jun. 2014), "3rd Generation Partnership Project; Technical Specification Group Services and System Aspects; Proximity-based services (ProSe); Stage 2 (Release 12)", Jun. 2014 (60 pages).
EADS, "Radio resource sharing between Public Safety groups using D2D," 3GPP TSG RAN WG1 Meeting #76, R1-140516, Feb. 10, 2014 (4 pages).
Extended European Search Report issued by the European Patent Office for European Application No. 15849341.1 dated May 2, 2018 (9 pages).
NEC Group, "Discussion on D2D Communication," 3GPP TSG RAN WG1 Meeting #74, R1-133348, Agenda Item 7.2.8.1, Barcelona, Spain, Aug. 19-23, 2013 (3 pages).
Samsung, Discussion on D2D Group Communication, 3GPP TSG RAN WG1 Meeting #74, R1-133117, Agenda Item 7.2.8.1, Barcelona, Spain, Aug. 19-23, 2013 (5 pages).
ZTE, "Resource allocation for D2D Communication," 3GPP TSG-RAN WG2 Meeting #85, R2-140693, Agenda Item 7.5.3, Praque, Czech Republic, Feb. 10-14, 2014 (5 pages).
China Notification of First Office Action issued in Chinese Patent Application No. 201580054641.8, dated Jun. 26, 2019, 16 pages.

\* cited by examiner

CONTROL APPARATUS AND METHOD FOR INTER-TERMINAL DIRECT COMMUNICATION

CROSS-REFERENCE TO RELATED APPLICATIONS

This application is a national stage application of International Application No. PCT/JP2015/003570 entitled "CONTROL APPARATUS AND METHOD FOR INTER-TERMINAL DIRECT COMMUNICATION," filed on Jul. 15, 2015, which claims the benefit of the priority of Japanese Patent Application No. 2014-206190, filed on Oct. 7, 2014, the disclosures of each of which are hereby incorporated by reference in their entirety.

TECHNICAL FIELD

The present application relates to Proximity Service (ProSe) communication (inter-terminal direct communication) performed by radio terminals, and more particularly to allocation of radio resources to a radio terminal that performs inter-terminal direct communication.

BACKGROUND ART

3GPP Release 12 specifies Proximity-based services (ProSe) (see, for example, Non-patent Literature 1 and 2). The ProSe includes ProSe discovery and ProSe direct communication. The ProSe discovery identifies that radio terminals capable of performing ProSe direct communication (i.e., ProSe-enabled UEs) are in proximity of each other. In an example, the ProSe discovery can be performed through a procedure in which a ProSe-enabled UE detects another ProSe-enabled UE by using only capability of a radio communication technology (e.g., Evolved Universal Terrestrial Radio Access (E-UTRA) technology) possessed by these two UEs. In another example, the ProSe discovery can be performed by a radio access network (E-UTRA Network (E-UTRAN)) or a core network (Evolved Packet Core (EPC)).

The ProSe direct communication enables establishment of communication paths between two or more ProSe-enabled UEs that are in direct communication range after the ProSe discovery procedure is performed. In other words, the ProSe direct communication enables a ProSe-enabled UE to communicate with another ProSe-enabled UE directly without communicating through a base station (eNodeB). The ProSe direct communication may be performed by using a radio communication technology that is also used to access a base station (eNodeB) (i.e., E-UTRA technology) or by using a wireless local area network (WLAN) radio technology (i.e., IEEE 802.11 radio technology).

In 3GPP Release 12, a ProSe function communicates with a ProSe-enabled UE through a Public Land Mobile Network (PLMN) and assists the ProSe discovery and the ProSe direct communication. The ProSe function is a logical function that is used for PLMN-related operations required for the ProSe. The ProSe function provides functionality including, for example, (a) communication with third-party applications (ProSe Application Server), (b) authentication of UEs for ProSe discovery and ProSe direct communication, (c) transmission of configuration information (e.g., designation of radio resources and transmission power) for ProSe discovery and ProSe direct communication to UEs, and (d) provision of EPC-level ProSe discovery. The ProSe function may be implemented in one or more network nodes or entities. In this specification, one or more network nodes or entities that implement the ProSe function are referred to as a "ProSe function entity" or a "ProSe function server".

The ProSe direct communication in 3GPP Release 12 is one example of the inter-terminal direct communication. Similarly to the ProSe in the 3GPP Release 12, inter-terminal direct communication in a public land mobile network (PLMN) includes the discovery phase and direct communication phase that are assisted by a function or a node (e.g., ProSe function) located in the network. The inter-terminal direct communication is performed between two or more radio terminals in proximity of each other without communicating through any network node (e.g., a base station). The inter-terminal direct communication is also referred to as "device-to-device (D2D) communication" or "peer-to-peer communication". The ProSe direct communication is an example of the inter-terminal direct communication and is also referred to as "ProSe communication".

The term "public land mobile network" in this specification indicates a wide-area radio infrastructure network, and means a multiple-access type mobile communication system. The multiple-access mobile communication system enables mobile terminals to perform radio communication substantially simultaneously by sharing radio resources including at least one of time resources, frequency resources, and transmission power resources among the mobile terminals. Typical examples of multiple-access technology include Time Division Multiple Access (TDMA), Frequency Division Multiple Access (FDMA), Code Division Multiple Access (CDMA), Orthogonal Frequency Division Multiple Access (OFDMA), and any combination thereof. The public land mobile network includes a radio access network and a core network. Examples of the public land mobile network include a 3GPP Universal Mobile Telecommunications System (UMTS), a 3GPP Evolved Packet System (EPS), a 3GPP2 CDMA2000 system, a Global System for Mobile communications (GSM (Registered Trademark))/General packet radio service (GPRS) system, a WiMAX system, and a mobile WiMAX system. The EPS includes a Long Term Evolution (LTE) system and an LTE-Advanced system.

Patent Literature 1 discloses that in response to detecting congestion in a network or a failure in a network node (e.g., base station), a server located in the network selects a terminal group to switch to inter-terminal direct communication and transmits, to radio terminals belonging to this terminal group, information about permission for direct communication and configuration information for a communication environment for the direct communication. The information about permission for direct communication indicates, for example, an identifier of radio terminals belonging to the terminal group. The configuration information for the communication environment indicates, for example, a frequency band, transmission power, and an identifier of a receiving terminal, which are used for the inter-terminal direct communication.

CITATION LIST

Patent Literature

Patent Literature 1: Japanese Unexamined Patent Application Publication No. 2013-229747

Non Patent Literature

Non-patent Literature 1: 3GPP TS 22.278 V12.4.0 (2013 September), "3rd Generation Partnership Project; Technical Specification Group Services and System Aspects; Service requirements for the Evolved Packet System (EPS) (Release 12)", September 2013

Non-patent Literature 2: 3GPP TS 23.303 V12.1.0 (2014 June), "3rd Generation Partnership Project; Technical Specification Group Services and System Aspects; Proximity-based services (ProSe); Stage 2 (Release 12)", June 2014

SUMMARY OF INVENTION

Technical Problem

There is a possibility that when a network failure (e.g., a stop or a malfunction of a base station, or a stop or a malfunction of a control-plane entity such as a Mobility Management Entity (MME) and a Home Subscriber Server (HSS)) occurs, a radio terminal cannot use communication through a PLMN. For example, a network failure that makes communication through a PLMN unavailable may occur due to natural disasters or man-made disasters such as earthquakes, tsunamis, fires, and power outages. Patent Literature 1 discloses that when a network failure occurs, a server allocates radio resources for inter-terminal direct communication to radio terminals belonging to a predetermined terminal group, thereby permitting these radio terminals to perform the inter-terminal direct communication within this terminal group. However, when the period during which the communication through the PLMN is unavailable is prolonged due to, for example, a large scale disaster, the use of only the inter-terminal direct communication within the specific terminal group could be unsatisfactory for radio terminals. That is, it may be desirable for radio terminals to be able to perform inter-terminal direct communication between terminals that do not belong to the same terminal group.

One of the objects to be attained by embodiments disclosed herein is to provide an apparatus, a method, and a program that contribute to facilitating inter-terminal direct communication. It should be noted that this object is merely one of the objects to be attained by the embodiments disclosed herein. The other objects or problems and novel features will be made apparent from the following description and the accompanying drawings.

Solution to Problem

In a first aspect, a method performed by a control apparatus includes: allocating a dedicated radio resource to a plurality of radio terminals for Proximity Service (ProSe) communication performed within a terminal group including the plurality of radio terminals without communicating through a public land mobile network; and allocating a shared radio resource to the plurality of radio terminals for ProSe communication performed between a radio terminal belonging to the terminal group and a radio terminal that does not belong to the terminal group.

In a second aspect, a control apparatus includes a memory and a processor coupled to the memory. The processor is adapted to allocate a dedicated radio resource to a plurality of radio terminals for Proximity Service (ProSe) communication performed within a terminal group including the plurality of radio terminals without communicating through a public land mobile network, and allocate a shared radio resource to the plurality of radio terminals for ProSe communication performed between a radio terminal belonging to the terminal group and a radio terminal that does not belong to the terminal group.

In a third aspect, a program includes a set of instructions (software codes) that, when loaded into a computer, causes the computer to perform the method according to the above-described first aspect.

Advantageous Effects of Invention

According to the above-described aspects, it is possible to provide an apparatus, a method, and a program for contributing to facilitating inter-terminal direct communication.

DESCRIPTION OF EMBODIMENTS

Specific embodiments are explained hereinafter in detail with reference to the drawings. The same or corresponding elements are denoted by the same symbols throughout the drawings, and duplicated explanations are omitted as necessary for the sake of clarity.

Embodiments described below will be explained mainly using specific examples with regard to an Evolved Packet System (EPS). However, these embodiments are not limited to being applied to the EPS and may also be applied to other mobile communication networks or systems such as a 3GPP (UMTS), a 3GPP2 CDMA2000 system, a GSM/GPRS system, and a WiMAX system.

First Embodiment

Figure 1:
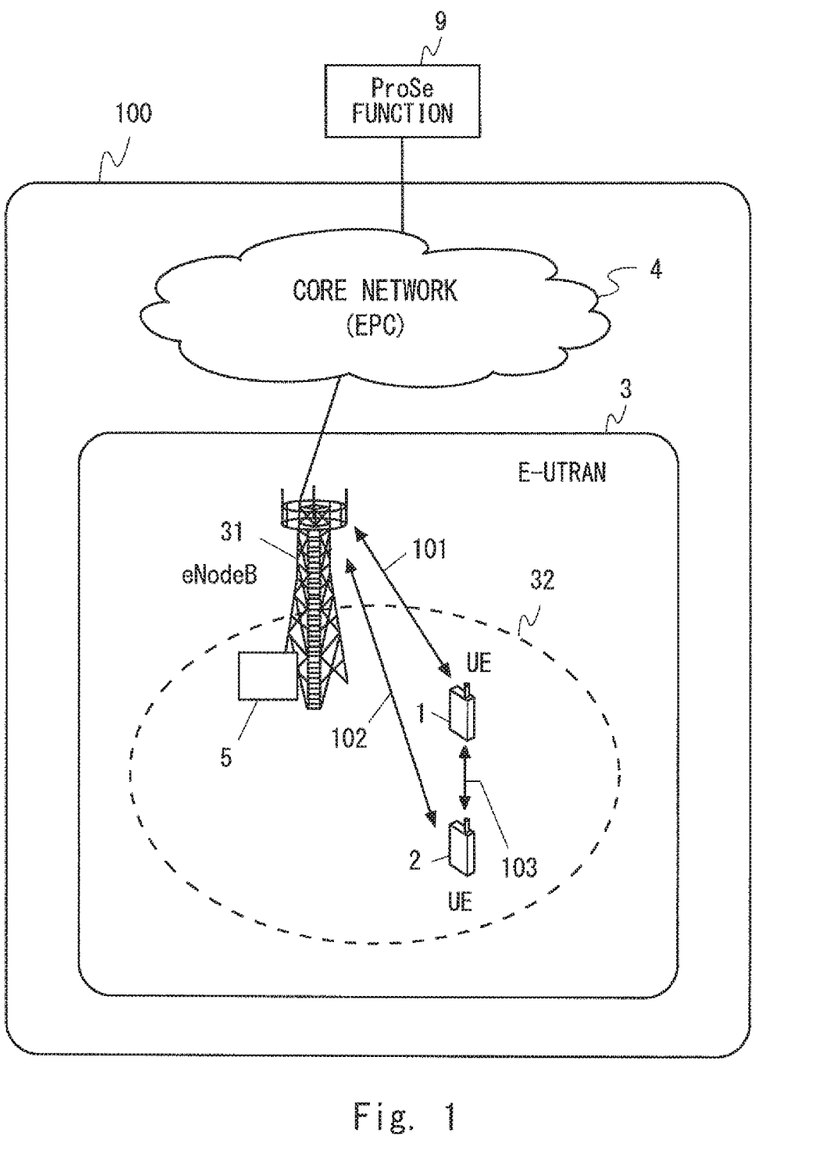
FIG. 1 shows a configuration example of a public land mobile network according to several embodiments.
Figure 2:
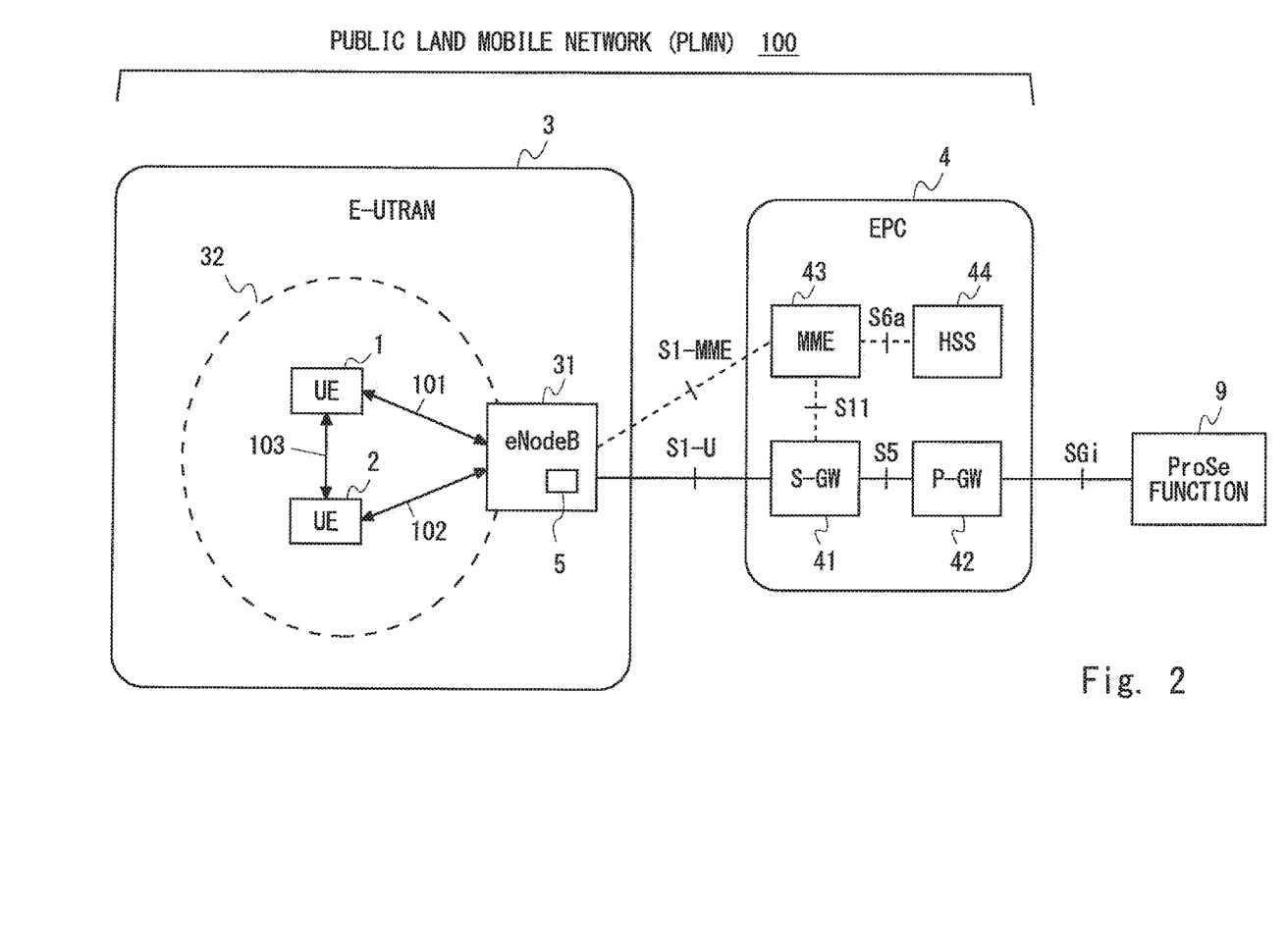
FIG. 2 shows a configuration example of a public land mobile network according to several embodiments.

FIGS. 1 and 2 show a configuration example of a PLMN 100 according to this embodiment. Both a UEs 1 and a UE 2 are radio terminals capable of performing ProSe (i.e., ProSe-enabled UEs), and they can establish a ProSe communication path 103 and perform ProSe direct communication (or ProSe communication, inter-terminal direct communication, or D2D communication) between them. The ProSe direct communication between the UEs 1 and 2 may be performed by using a radio communication technology that is also used to access a base station (eNodeB) (i.e., E-UTRA technology) or by using a WLAN radio technology (IEEE 802.11 radio technology).

An eNodeB 31 is an entity located in a radio access network (i.e., E-UTRAN) 3, manages a cell 32 and is able to perform communication (101 and 102) with the UEs 1 and 2 on frequencies licensed to the E-UTRAN 3 by using the E-UTRA technology.

A core network (i.e., EPC) 4 includes a plurality of user-plane entities (e.g., a Serving Gateway (S-GW) 41 and a Packet Data Network Gateway (P-GW) shown in FIG. 2) and a plurality of control-plane entities (e.g., a Mobility Management Entity (MME) 43 and a Home Subscriber Server (HSS) 44 shown in FIG. 2). The user-plane entities relay user data of the UEs 1 and 2 between the E-UTRAN 3 and an external network (Packet Data Network (PDN)). The control-plane entities perform various types of control for the UEs 1 and 2 including mobility management, session management (bearer management), and billing management.

In order to start ProSe direct communication (103) in the cell 32, each of the UE 1 and the UE 2 attaches to the core network (i.e., EPC) 4 through the eNodeB 31, establishes a Packet Data Network (PDN) connection for communicating with a ProSe function entity 9, and transmits and receives ProSe control signaling to and from the ProSe function entity 9 through the E-UTRAN 3 and the EPC 4. The UEs 1 and 2 may use a ProSe discovery service provided by the ProSe function entity 9. The UEs 1 and 2 may receive from the ProSe function entity 9 a message indicating permission for the UEs 1 and 2 to activate ProSe discovery or ProSe direct communication. The UEs 1 and 2 may receive, from the ProSe function entity 9, configuration information for ProSe discovery or ProSe direct communication in the cell 32. Note that an interface (PC3 reference point) between the ProSe function and each of the UEs 1 and 2 depends on the user plane of the E-UTRAN 3 and the EPC 4, and accordingly the ProSe control signaling is transferred on this user plane. Therefore, as shown in FIG. 2, the ProSe function entity 9 communicates with the EPC 4 (i.e., the P-GW 42) through the SGi reference point, which is a reference point between a PDN Gateway (P-GW) 42 and a PDN.

The UEs 1 and 2 are able to perform ProSe direct communication within a UE group including a plurality of UEs. Although FIGS. 1 and 2 show only two UEs 1 and 2, the UEs 1 and 2 may perform ProSe direct communication within a UE group including three or more UEs. A control apparatus 5 allocates radio resource(s) for ProSe direct communication (103) within the UE group including the UEs 1 and 2. Hereinafter, the radio resource for ProSe direct communication is referred to as a "ProSe radio resource". The ProSe radio resource includes at least one of time resources, frequency resources, and transmission power resources. That is, the control apparatus 5 allocates a dedicated radio resource for the ProSe direct communication (103) and permits the UE group including the UEs 1 and 2 to use the allocated dedicated radio resource.

The dedicated ProSe radio resource is preferably a frequency different from frequencies to be allocated for ProSe direct communication performed by other UE groups in or near the cell 32. In other words, the dedicated ProSe radio resource is preferably a frequency that is available (i.e., permitted) only to ProSe direct communication performed by the UE group, to which the UEs 1 and 2 belong, in or near the cell 32. In this way, it is possible to reduce interference between UE groups and thereby improve the quality of ProSe direct communication. The dedicated ProSe radio resource to be allocated may be selected from the frequency spectrum licensed to the E-UTRAN 3 (i.e., licensed frequency band) or may be selected from a frequency spectrum that is not licensed to the E-UTRAN 3 (i.e., unlicensed frequency bands). The frequency spectrum licensed to the E-UTRAN 3 means a frequency spectrum exclusively used by the E-UTRAN 3 and is usually licensed to an operator of the E-UTRAN 3 by a government agency in each country. In the case of E-UTRAN (LTE), the licensed frequency is, for example, a 700 MHz band, an 800 MHz band, a 1.8 GHz band, a 2.1 GHz band, or a 2.6 GHz band. Meanwhile, the frequency spectrum that is not licensed to the E-UTRAN 3 means a frequency spectrum that is licensed to other systems (e.g., a TV broadcast system) or a frequency spectrum that is not licensed to any organization or system and can be freely used (e.g., a 2.4 GHz band and a 5 GHz band).

In an example, the control apparatus 5 may be located in a radio access network (e.g., the E-UTRAN 3) and, more specifically, integrally located with a radio resource control entity (e.g., a base station or a base station controller) in the radio access network. In the case of E-UTRAN, the control apparatus 5 may be located in the eNodeB 31 as shown in FIGS. 1 and 2. In the case of UTRAN, the control apparatus 5 may be located in a Radio Network Controller (RNC). In another example, the control apparatus 5 may be located in a core network (e.g., the EPC 4) and, more specifically, integrally located with an existing core-network entity (e.g., the MME 43 or the HSS 44). In still another example, the control apparatus 5 may be located outside the E-UTRAN 3 and the EPC 4. The control apparatus 5 may be integrally located with the ProSe function entity 9.

The control apparatus 5 further operates so as to allocate an additional ProSe radio resource, in addition to the dedicated ProSe radio resource allocated in a normal state. In an example, when an occurrence of a serious network failure that could prevent the UEs 1 and 2 from performing communication through the PLMN 100 is expected, the control apparatus 5 allocates a shared ProSe radio resource used for ProSe direct communication between UE groups in addition to the dedicated ProSe radio resource.

Figure 3:
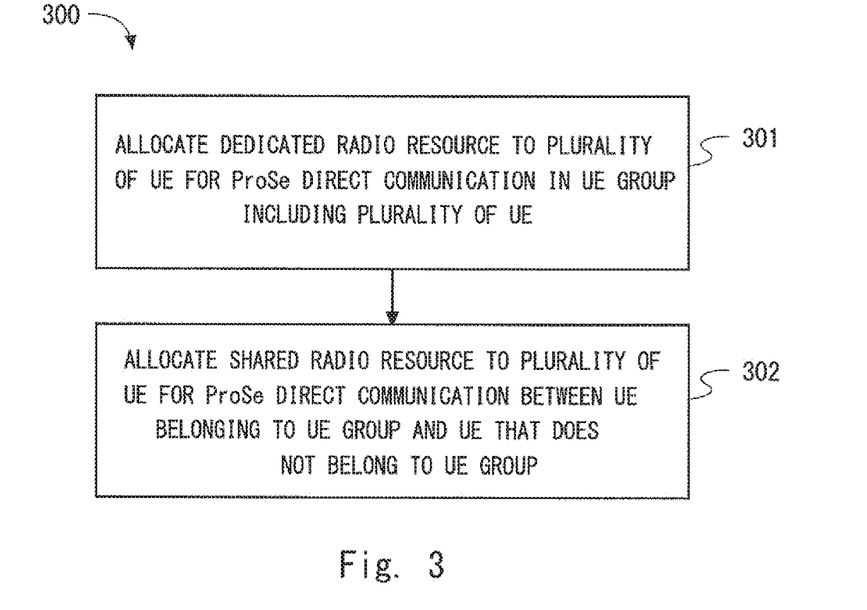
FIG. 3 is a flowchart showing an operation example performed by a control apparatus for allocating a resource for ProSe communication (inter-terminal direct communication) according to a first embodiment.

FIG. 3 is a flowchart showing an example (300) of processes performed by the control apparatus 5. In Block 301, the control apparatus 5 allocates a dedicated radio resource to a plurality of UEs (UEs 1 and 2) for ProSe direct communication within a UE group including this plurality of UEs. In Block 302, the control apparatus 5 allocates a shared radio resource to the plurality of UEs for ProSe direct communication between a UE belonging to the UE group and a UE that does not belong to the UE group. That is, the shared ProSe radio resource is used for ProSe direct communication between UE groups or ProSe direct communication between arbitrary UEs irrespective of whether each of them belongs to a specific UE group. The shared ProSe radio resource to be allocated may be selected from the frequency spectrum licensed to the E-UTRAN 3 (i.e., licensed frequency band) or may be selected from a frequency spectrum that is not licensed to the E-UTRAN 3 (i.e., unlicensed frequency bands).

Applying the processes 300 shown in FIG. 3, when a network failure occurs, for example, the UEs 1 and 2 can perform high-quality ProSe direct communication within the UE group to which they belong under low interference conditions and further perform broad ProSe direct communication between UE groups (or between arbitrary UEs irrespective of whether each of them belongs to a specific UE group). Note that, the process for allocating the shared radio resource for ProSe communication between UE groups, in addition to the allocation of the dedicated radio resource for ProSe direct communication within the UE group, may be performed irrespective of an occurrence of a network failure or a possibility thereof.

Second Embodiment

This embodiment provides a specific example of the process for allocating a ProSe radio resource explained in the first embodiment. In this embodiment, in response to an event associated with a network failure, the control apparatus 5 permits radio terminals to use a shared ProSe radio resource for ProSe communication between UE groups in addition to a dedicated radio resource for ProSe communication within a UE group. A configuration example of a public land mobile network according to this embodiment is similar to that shown in FIGS. 1 and 2.

Figure 4:
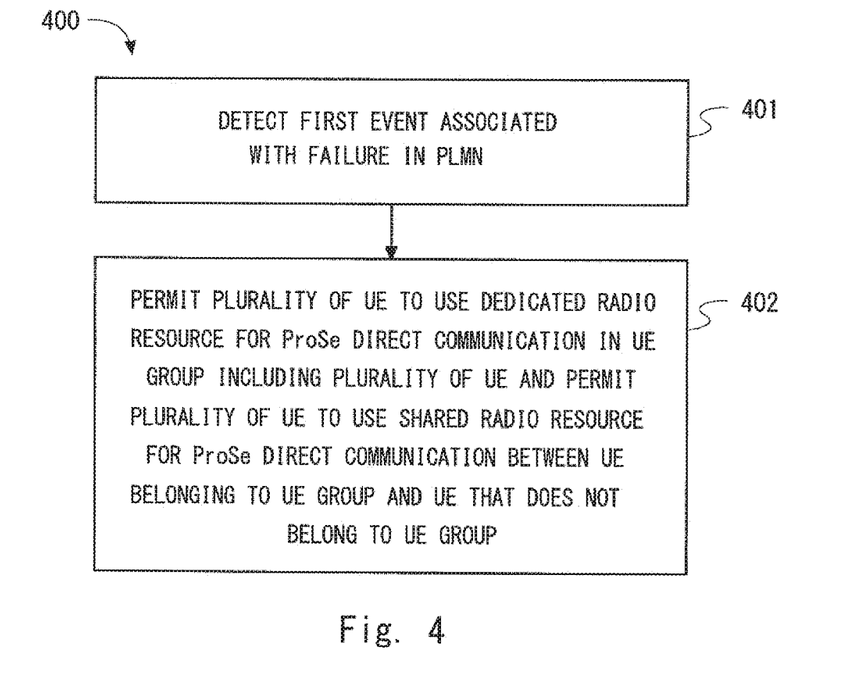
FIG. 4 is a flowchart showing an operation example performed by a control apparatus for allocating a resource for ProSe communication according to a second embodiment.

FIG. 4 is a flowchart showing an example (400) of processes performed by the control apparatus 5. In Block 401, the control apparatus 5 detects an occurrence of a first event associated with a failure in the PLMN 100. The first event is, for example, detection of a failure or performance deterioration in the PLMN 100, reception of a message indicating an occurrence of a failure in the PLMN 100 or a warning thereof, or reception of a message indicating an occurrence of a disaster in an area where the PLMN 100 is located or a warning thereof (e.g., an earthquake early warning, a tsunami warning, or a power outage warning).

In Block 402, in response to the first event, the control apparatus 5 permits a plurality of UEs (UEs 1 and 2) to use a dedicated radio resource for ProSe direct communication within a UE group including the plurality of UEs and further permits this plurality of UEs to use a shared radio resource for ProSe direct communication between a UE belonging to this UE group and a UE that does not belong to this UE group. That is, the shared radio resource is used for ProSe direct communication between UE groups or ProSe direct communication between arbitrary UEs irrespective of whether each of them belongs to a specific UE group. Applying the processes 400 shown in FIG. 4, when a network failure occurs, the UEs 1 and 2 can perform high-quality ProSe direct communication within the UE group to which they belong under low interference conditions and further perform broad ProSe direct communication between UE groups (or between arbitrary UEs irrespective of whether each of them belongs to a specific UE group).

Figure 5:
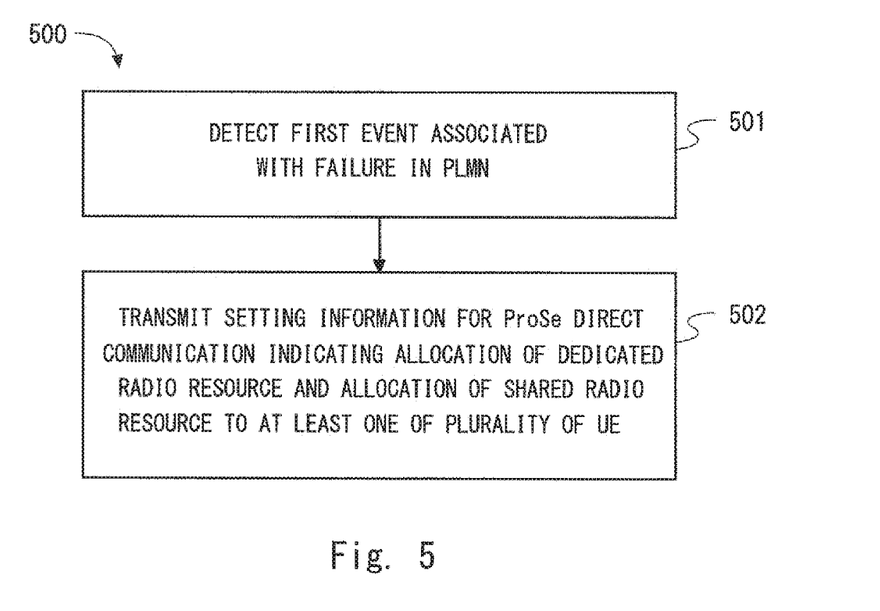
FIG. 5 is a flowchart showing an operation example performed by a control apparatus for allocating a resource for ProSe communication according to the second embodiment.

FIG. 5 is a flowchart showing another example (500) of the processes performed by the control apparatus 5. The processes 500 shown in FIG. 5 are a modified example of the processes 400 shown in FIG. 4. A process in Block 501 is similar to that in Block 401 shown in FIG. 4. In Block 502, in response to the first event, the control apparatus 5 transmits, to at least one of the UEs 1 and 2, configuration information for ProSe direct communication indicating allocation of a dedicated radio resource for the UE group to which the UEs 1 and 2 belong and allocation of a shared radio resource for ProSe direct communication between UE groups. The configuration information, which has been transmitted from the control apparatus 5 to one of the UEs 1 and 2 (e.g., UE 1), may be transmitted to the other UE (e.g., UE 2) through the ProSe communication path 103.

In the case where the control apparatus 5 is located in the eNodeB 31, the control apparatus 5 may transmit the configuration information for ProSe direct communication by using broadcast information that can be received by a plurality of UEs (i.e., System Information Block (SIB)) or may transmit the configuration information by using control signaling for each UE (i.e., Radio Resource Control (RRC) signaling). In the case where the control apparatus 5 is located in the EPC 4, the control apparatus 5 may transmit the configuration information for ProSe direct communication by using a Non-Access Stratum (NAS) message. In the case where the control apparatus 5 is located in the ProSe function entity 9, the control apparatus 5 may transmit the configuration information for ProSe direct communication in the same manner as user-plane data.

Figure 6:
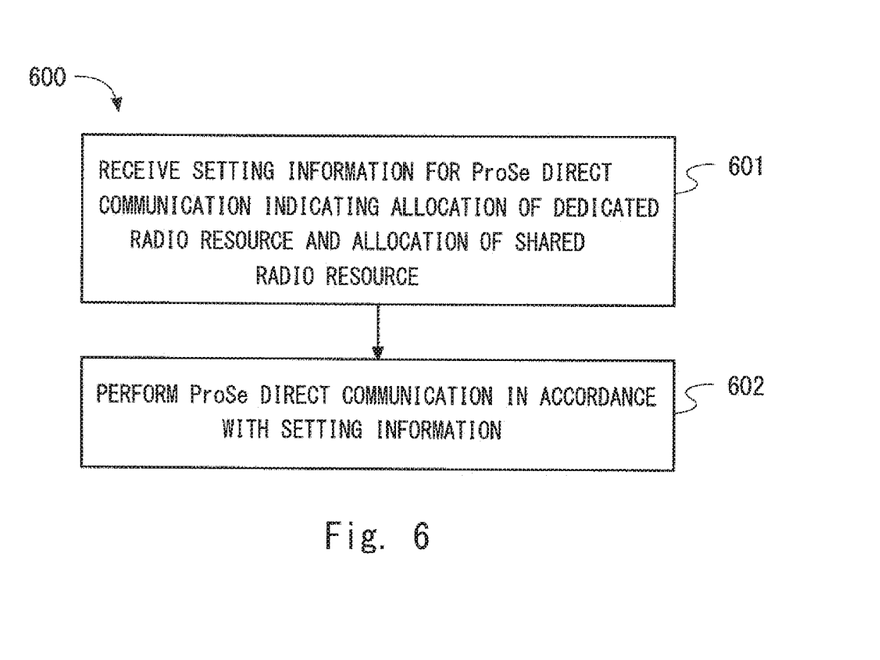
FIG. 6 is a flowchart showing an operation example performed by a radio terminal for allocating a resource for ProSe communication according to the second embodiment.

FIG. 6 is a flowchart showing an example (600) of processes performed by the UE 1. Note that the processes 600 shown in FIG. 6 may be performed by the UE 2 or by both of the UEs 1 and 2. In Block 601, the UE 1 receives, from the control apparatus 5, configuration information for ProSe direct communication indicating allocation of a dedicated ProSe radio resource and allocation of a shared ProSe radio resource. In Block 602, in accordance with the received configuration information for ProSe direct communication, the UE 1 performs ProSe direct communication within the UE group, which includes the UEs 1 and 2, using the dedicated radio resource and further performs ProSe direct communication with a UE(s) that does not belong to the UE group using the shared radio resource. For example, the UEs 1 and 2 may start ProSe direct communication in response to detection of a stop of the communication service provided by the PLMN 100.

Note that the processes shown in FIGS. 4 to 6 are merely examples. The control apparatus 5 may notify the UEs 1 and 2 of the allocation of the dedicated ProSe radio resource and the allocation of the shared ProSe radio resource at different timings by using different control messages from each other. For example, the control apparatus 5 may allocate the dedicated ProSe radio resource to the UE group, to which the UEs 1 and 2 belong, in response to another event (hereinafter "second event") before the occurrence of the first event. The second event is an event for activating normal ProSe direct communication and is not associated with a network failure. The second event may be reception of a request message from the UE 1, the UE 2 or the ProSe function entity 9. That is, when the second event that is not associated with a failure occurs, the control apparatus 5 permits the UEs 1 and 2 to use the dedicated radio resource for the direct communication within the UE group, but does not permit the UEs 1 and 2 to use the shared radio resource for the ProSe direct communication between UE groups. In this case, the control apparatus 5 may notify at least one of the UEs 1 and 2 of the allocation of the shared radio resource for the ProSe direct communication between UE groups in response to the first event.

Third Embodiment

This embodiment provides a specific example of the process for allocating a ProSe radio resource when a network failure occurs, which is explained in the second embodiment. Specifically, an example in which the control apparatus 5 is located in the eNodeB 31 and the first event is detected in the eNodeB 31 is explained. A configuration example of a public land mobile network according to this embodiment is similar to that shown in FIGS. 1 and 2.

Figure 7:
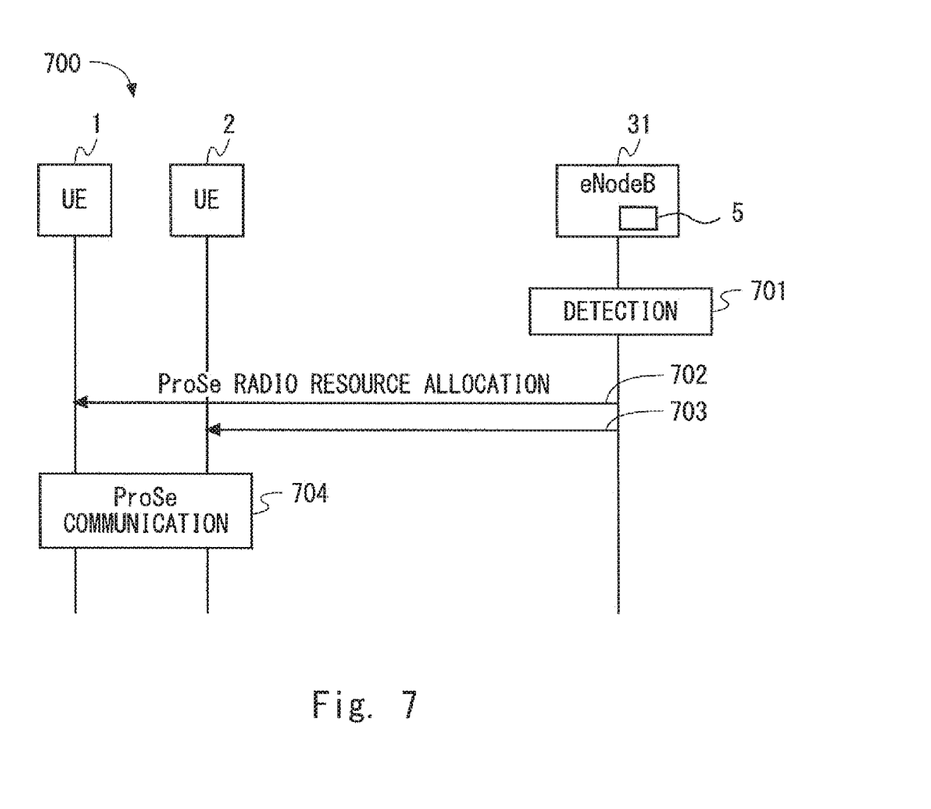
FIG. 7 is a sequence diagram showing an example of processes for allocating a resource for ProSe communication according to a third embodiment.

FIG. 7 is a sequence diagram showing processes 700 according to this embodiment. In Block 701, the eNodeB 31 (i.e., the control apparatus 5) detects a failure in the E-UTRAN 3 (e.g., a malfunction of the eNodeB 31) as the first event. Alternatively, the eNodeB 31 (i.e., the control apparatus 5) may detects the first event by receiving a message indicating an occurrence of a failure in the PLMN 100 or a warning thereof from an Operation, Administration and Maintenance (OAM) system. Alternatively, the eNodeB 31 (i.e., the control apparatus 5) may detects the first event by receiving a message indicating an occurrence of a disaster or a warning thereof from the EPC 4 or the OAM system.

In Blocks 702 and 703, the eNodeB 31 (i.e., the control apparatus 5) transmits to the UEs 1 and 2, in response to the first event, configuration information indicating allocation of a ProSe radio resource. This configuration information indicates allocation of a shared radio resource that can be used for ProSe direct communication between UE groups (or ProSe direct communication between arbitrary UEs irrespective of whether each of them belongs to a specific UE group). In Block 704, the UEs 1 and 2 perform ProSe direct communication in accordance with the received configuration information. Applying the processes 700, when a network failure occurs, the UEs 1 and 2 can perform broad ProSe direct communication between UE groups (or between arbitrary UEs irrespective of whether each of them belongs to a specific UE group).

Fourth Embodiment

This embodiment provides a specific example of the process for allocating a ProSe radio resource when a network failure occurs, which is explained in the second embodiment. Specifically, an example in which the control apparatus 5 is located in the ProSe function entity 9 and the first event is detected in the eNodeB 31 is explained. A configuration example of a public land mobile network according to this embodiment is similar to that shown in FIGS. 1 and 2.

Figure 8:
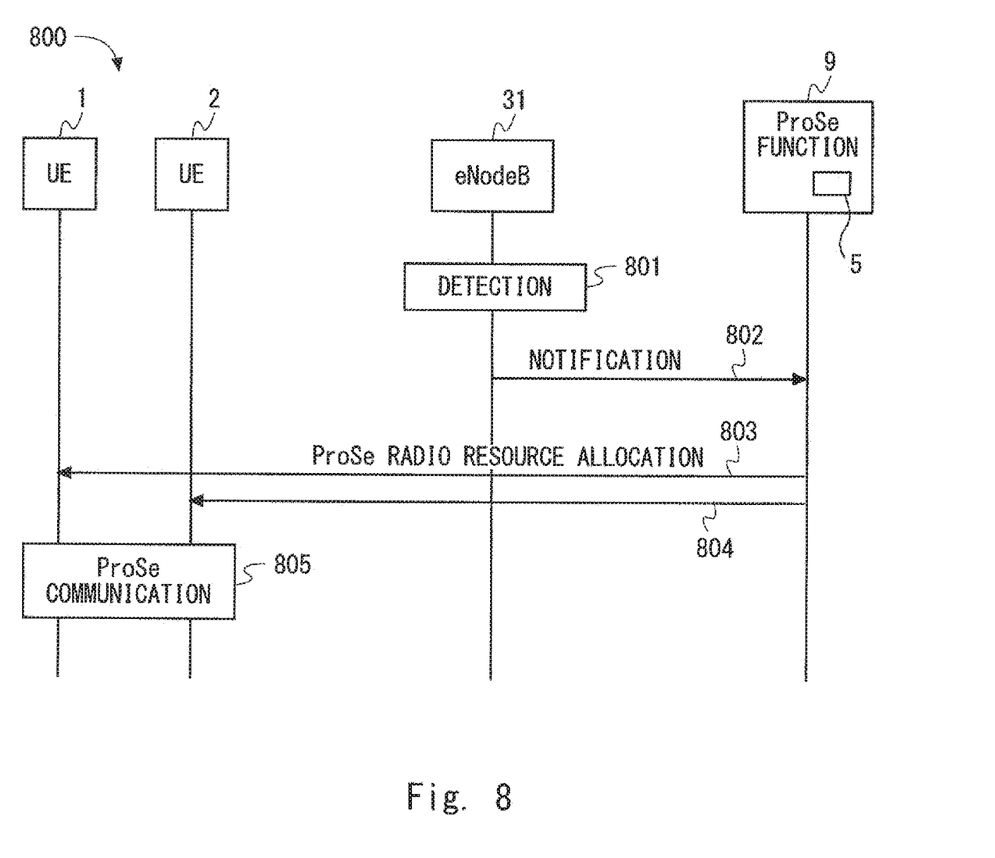
FIG. 8 is a sequence diagram showing an example of processes for allocating a resource for ProSe communication according to a fourth embodiment.

FIG. 8 is a sequence diagram showing processes 800 according to this embodiment. In Block 801, the eNodeB 31 detects a failure in the E-UTRAN 3 (e.g., a malfunction of the eNodeB 31) as the first event. Alternatively, the first event may be reception by the eNodeB 31 of a message indicating an occurrence of a failure in the PLMN 100 or a warning thereof, or it may be reception by the eNodeB 31 of a message indicating an occurrence of a disaster or a warning thereof. In Block 802, the eNodeB 31 notifies the ProSe function entity 9 (i.e., the control apparatus 5) of the detection of the first event. The notification in Block 802 may be sent to the ProSe function entity 9 through one or more control-plane nodes (e.g., the MME 43 and the HSS 44) in the core network.

In Blocks 803 and 804, the ProSe function entity 9 (i.e., the control apparatus 5) transmits to the UEs 1 and 2, in response to the first event, configuration information indicating allocation of a ProSe radio resource. This configuration information indicates allocation of a shared radio resource that can be used for ProSe direct communication between UE groups (or ProSe direct communication between arbitrary UEs irrespective of whether each of them belongs to a specific UE group). In Block 805, the UEs 1 and 2 perform ProSe direct communication in accordance with the received configuration information. Applying the processes 800, when a network failure occurs, the UEs 1 and 2 can perform broad ProSe direct communication between UE groups (or between arbitrary UEs irrespective of whether each of them belongs to a specific UE group).

Fifth Embodiment

This embodiment provides a specific example of the process for allocating a ProSe radio resource when a network failure occurs, which is explained in the second embodiment. Specifically, an example in which the control apparatus 5 is located in the ProSe function entity 9 and the first event is detected in the eNodeB 31 is explained. A configuration example of a public land mobile network according to this embodiment is similar to that shown in FIGS. 1 and 2.

Figure 9:
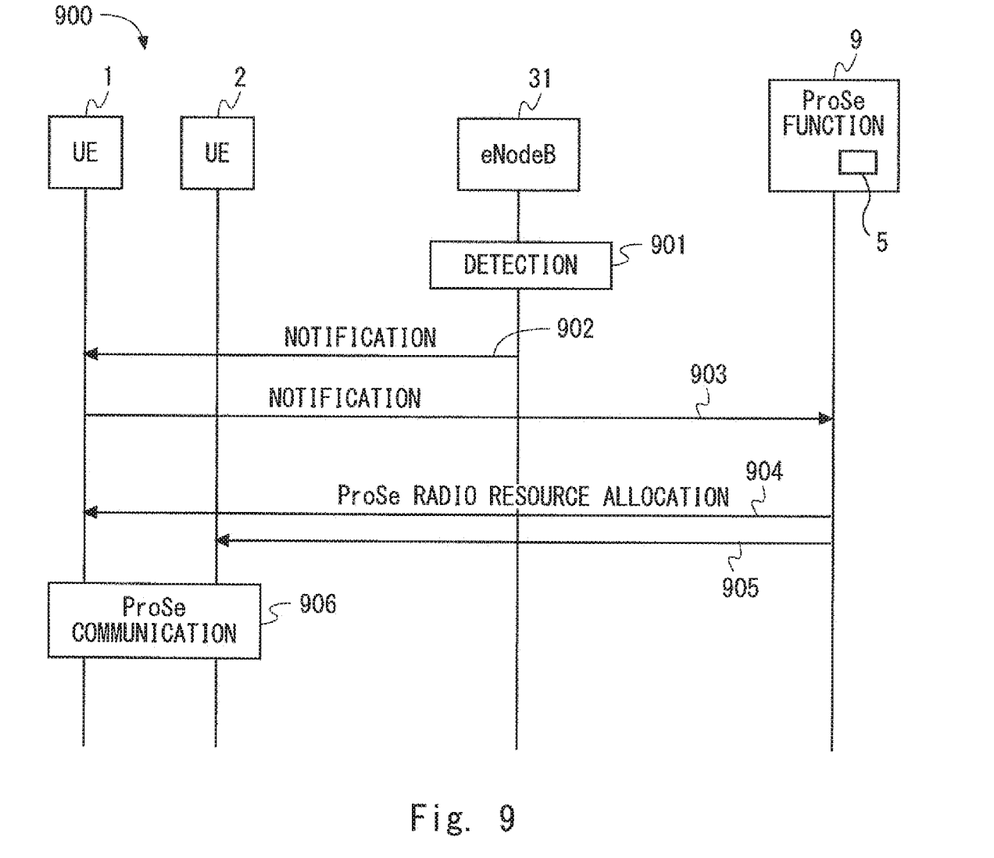
FIG. 9 is a sequence diagram showing an example of processes for allocating a resource for ProSe communication according to a fifth embodiment.

FIG. 9 is a sequence diagram showing processes 900 according to this embodiment. A process in Block 901 is similar to that in Block 801 shown in FIG. 8. The eNodeB 31 notifies the ProSe function entity 9 (i.e., the control apparatus 5) of detection of the first event through the UE 1 (Blocks 902 and 903). That is, the eNodeB 31 notifies the UE 1 of detection of the first event (Block 902) and the UE 1 notifies the ProSe function entity 9 (i.e., the control apparatus 5) of the detection of the first event (Block 903). The processes in Blocks 904 to 906 are similar to those in Blocks 803 to 805 shown in FIG. 8. Applying the processes 900, when a network failure occurs, the UEs 1 and 2 can perform broad ProSe direct communication between UE groups (or between arbitrary UEs irrespective of whether each of them belongs to a specific UE group).

Sixth Embodiment

This embodiment provides a specific example of the process for allocating a ProSe radio resource when a network failure occurs, which is explained in the second embodiment. Specifically, the control apparatus 5 allocates a ProSe radio resource to a plurality of UEs (UEs 1 and 2) even when these UEs belong to different cells 32 from each other. The cells 32 to which the UEs 1 and 2 belong may be cells located adjacent to each other, or they may be cells included in the same peripheral-cell group defined based on their proximity. A configuration example of a public land mobile network according to this embodiment is similar to that shown in FIGS. 1 and 2.

Figure 10:
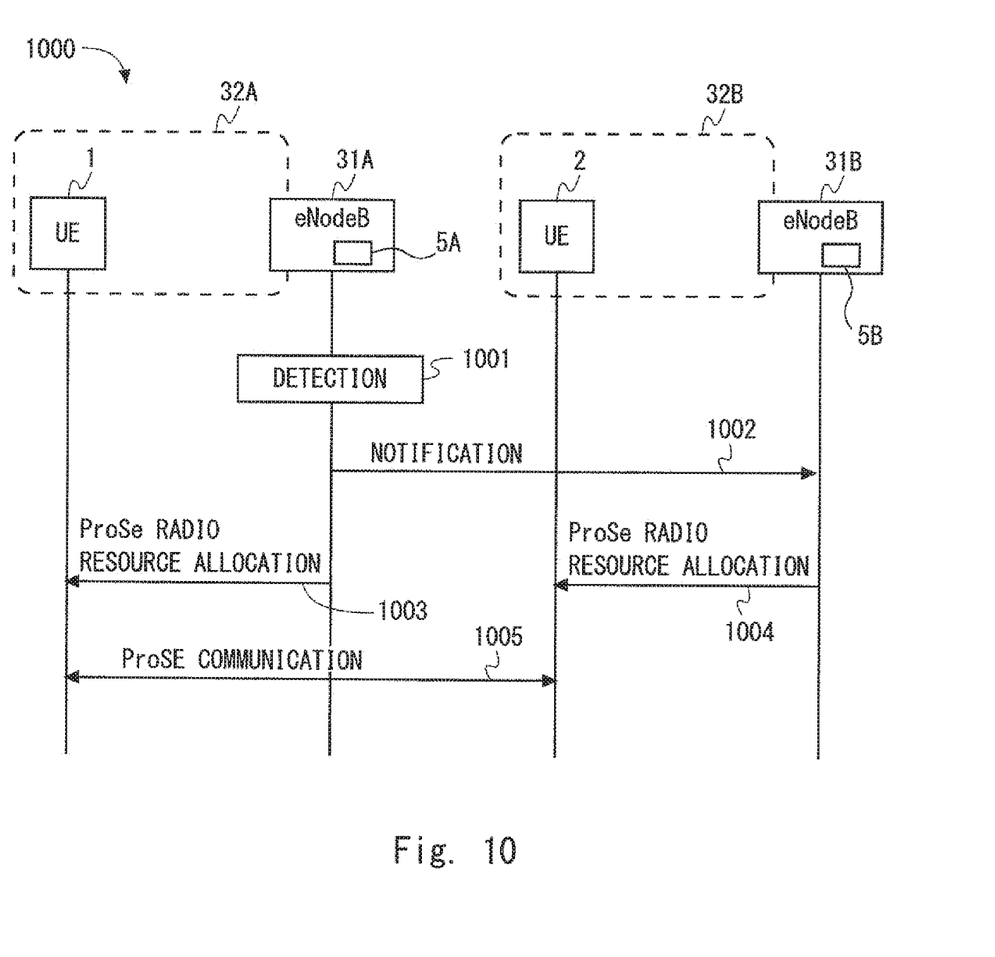
FIG. 10 is a sequence diagram showing an example of processes for allocating a resource for ProSe communication according to a sixth embodiment.

FIG. 10 is a sequence diagram showing processes 1000 according to this embodiment. In the example shown in FIG. 10, the UE 1 is located in a cell 32A managed by an eNodeB 31A and the UE 2 is located in a cell 32B managed by an eNodeB 31B. In Block 1001, the eNodeB 31A (i.e., a control apparatus 5A) detects the first event. In Block 1002, the eNodeB 31A (the control apparatus 5A) notifies the eNodeB 31B (i.e., a control apparatus 5B) of the detection of the first event. The notification in Block 1002 may include an indication for specifying a shared ProSe radio resource. Then, the eNodeB 31A (the control apparatus 5A) transmits, to the UE 1 located in the cell 32A, configuration information indicating allocation of the shared ProSe radio resource (Block 1003) and the eNodeB 31B (the control apparatus 5B) transmits, to the UE 2 located in the cell 32B, configuration information indicating allocation of the shared ProSe radio resource (Block 1004). In Block 1005, the UEs 1 and 2 perform ProSe direct communication in accordance with the configuration information received in Blocks 1003 and 1004.

The processes 1000 shown in FIG. 10 can be modified in the same manners as the processes for allocating ProSe radio resources explained in the second to fifth embodiments. For example, the control apparatus 5 may be located in a control-plane entity in the EPC 4 or may be located in the ProSe function entity 9. The first event may be detected by a control-plane entity in the EPC 4 or may be detected by the ProSe function entity 9.

In this embodiment, for example, when the eNodeB 31A and the cell 32A are in a stopped state but the eNodeB 31B and the cell 32B are in operation, the UE 1 can perform communication through the PLMN 100 by way of the ProSe communication path 103 between the UEs 1 and 2. Further, when a wide-area failure that causes both the eNodeBs 31A and 31B to be stopped occurs, the UEs 1 and 2 can perform ProSe direct communication within their UE group and ProSe direct communication between UE groups.

Figure 11:
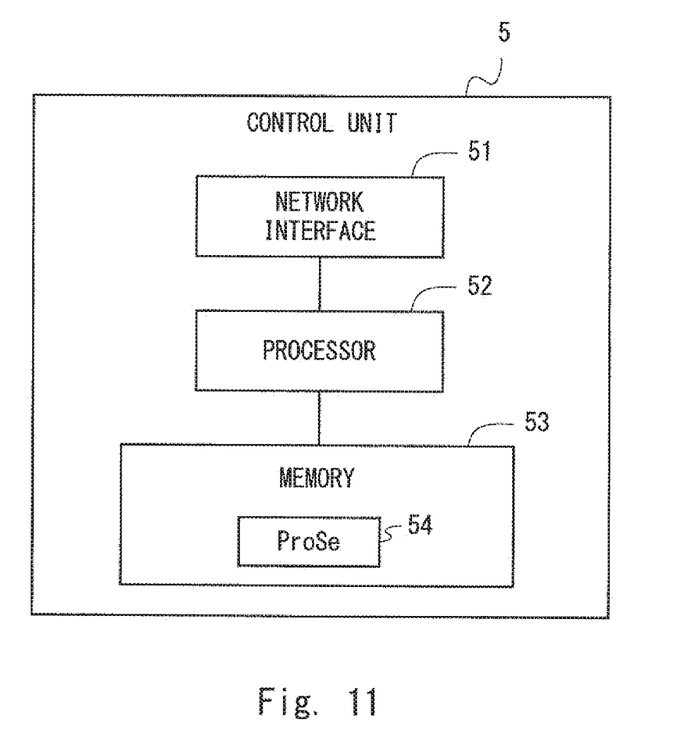
FIG. 11 is a block diagram showing a configuration example of a control apparatus.

Lastly, configuration examples of the control apparatus 5 and the UEs 1 and 2 according to the above-described embodiments are explained. FIG. 11 shows a configuration example of the control apparatus 5. Referring to FIG. 11, the control apparatus 5 includes a network interface 51, a processor 52, and a memory 53. The network interface 51 is used to communicate with a network node (e.g., MME 43 and ProSe function entity 9). The network interface 51 may include, for example, a Network Interface Card (NIC) conforming to the IEEE 802.3 series.

The processor 52 loads software (computer program) from the memory 53 and executes these loaded software, and thereby performs processes of the control apparatus 5 related to the processes 300, 400, 500, 700, 800, 900 or 1000 explained in the above-described embodiments. The processor 52 may be, for example, a microprocessor, a Micro Processing Unit (MPU), or a Central Processing Unit (CPU). The processor 52 may include a plurality of processors.

The memory 53 consists of a volatile memory and a nonvolatile memory. The volatile memory is, for example, a Static Random Access Memory (SRAM), a Dynamic RAM (DRAM), or a combination of them. The nonvolatile memory is, for example, a Mask Read Only Memory (MROM), a Programmable ROM (PROM), a flash memory, a hard disk drive, or any combination of them. The memory 53 may include a storage that is remotely arranged from the processor 52. In this case, the processor 52 may access the memory 53 through the network interface 51 or an I/O interface (not shown).

In the example shown in FIG. 11, the memory 53 is used to store software modules including a ProSe module 54. The ProSe module 54 includes instructions and data necessary for performing processes of the control apparatus 5 related to the processes 300, 400, 500, 700, 800, 900 or 1000 explained in the above-described embodiments. The processor 52 loads software modules including the ProSe module 54 from the memory 53 and executes these loaded modules, and thereby performing the processes of the control apparatus 5 explained in the above-described embodiments.

Figure 12:
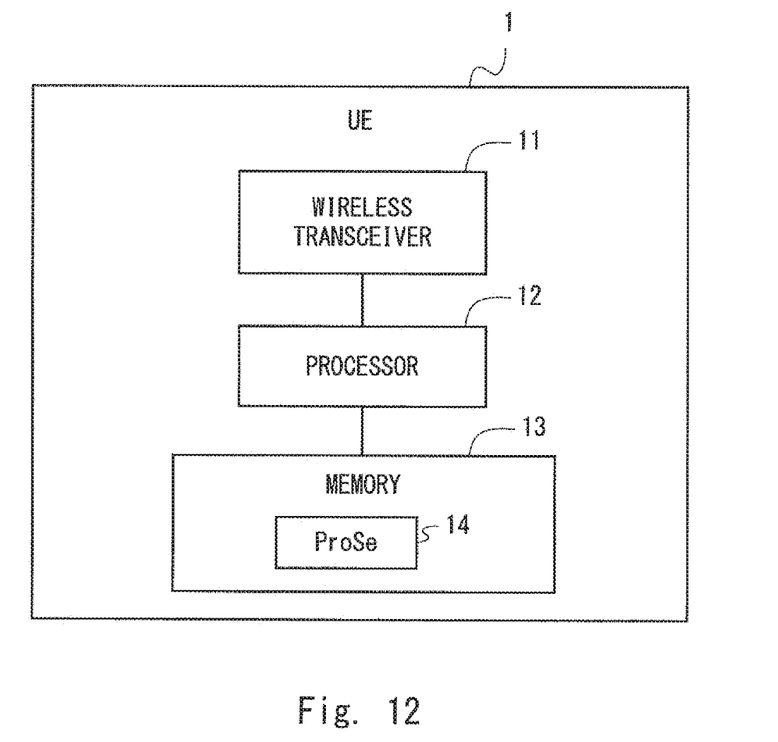
FIG. 12 is a block diagram showing a configuration example of a radio terminal.

FIG. 12 shows a configuration example of the UE 1. The UE 2 may have a configuration similar to that of the UE 1. Referring to FIG. 12, the UE 1 includes a wireless transceiver 11, a processor 12, and a memory 13. The wireless transceiver 11 is used for communication (101 in FIGS. 1 and 2) with the E-UTRAN 3 (eNodeB 31) and for the ProSe direct communication (103 in FIGS. 1 and 2). The wireless transceiver 11 may include a plurality of transceivers, for example, an E-UTRA (Long Term Evolution (LTE)) transceiver and a WLAN transceiver.

The processor 12 loads software (computer program) from the memory 13 and executes these loaded software, and thereby performs processes of the UE 1 related to the processes 600, 700, 800, 900 or 1000 explained in the above-described embodiments. The processor 12 may be, for example, a microprocessor, an MPU, or a CPU. The processor 12 may include a plurality of processors.

The memory 13 consists of a volatile memory and a nonvolatile memory. The volatile memory is, for example, an SRAM, a DRAM, or a combination of them. The nonvolatile memory is, for example, an MROM, a PROM, a flash memory, a hard disk drive, or any combination of them. The memory 13 may include a storage that is located apart from the processor 12. In this case, the processor 12 may access the memory 13 through an I/O interface (not shown).

In the example shown in FIG. 12, the memory 13 is used to store software modules including a ProSe module 14. The ProSe module 14 includes instructions and data necessary for performing processes of the UE 1 related to the processes 600, 700, 800, 900 or 1000 explained in the above-described embodiments. The processor 12 loads software modules including the ProSe module 14 from the memory 13 and executes these loaded modules, and thereby performing the processes of the UE 1 explained in the above-described embodiments.

As explained above with reference to FIGS. 11 and 12, each of the processors included in the control apparatus 5 and the UEs 1 and 2 according to the above-described embodiments executes one or more programs including instructions to cause a computer to perform an algorithm explained with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wire communication path such as an electrical wire and an optical fiber, or wireless communication path.

Other Embodiments

Each of the above-described embodiments may be used individually, or two or more of the embodiments may be appropriately combined with one another.

The third to sixth embodiments provide examples in which a signaling procedure for allocating dedicated and shared ProSe radio resources to the UEs 1 and 2 is performed in response to the first event related to a failure in the PLMN 100. However, the signaling procedures explained in the third to sixth embodiments may be performed in response to other events that are not associated with a failure in the PLMN 100.

The above-described embodiments are explained by using specific examples mainly related to the EPS. However, these embodiments may be applied to other mobile communication systems such as a Universal Mobile Telecommunications System (UMTS), a 3GPP2 CDMA2000 system (1×RTT, High Rate Packet Data (HRPD)), a Global System for Mobile communications (GSM)/General packet radio service (GPRS) system, and a mobile WiMAX system.

Further, the above-described embodiments are merely examples of applications of the technical ideas obtained by the inventor. Needless to say, these technical ideas are not limited to the above-described embodiments and various modifications can be made thereto.

This application is based upon and claims the benefit of priority from Japanese patent application No. 2014-206190, filed on Oct. 7, 2014, the disclosure of which is incorporated herein in its entirety by reference.

REFERENCE SIGNS LIST

1 UE
2 UE
3 E-UTRAN
4 EPC
5 CONTROL APPARATUS
9 ProSe function ENTITY
31 eNodeB
32 CELL
100 PLMN
103 ProSe COMMUNICATION PATH

The invention claimed is:

1. A method performed by a control apparatus, comprising:
    allocating a dedicated radio resource to a first radio terminal for Proximity Service (ProSe) communication performed within a terminal group including the first radio terminal and a second radio terminal without communicating through a public land mobile network; and
    allocating a shared radio resource to the first radio terminal for ProSe communication performed between the first radio terminal and a third radio terminal that does not belong to the terminal group,
    wherein said allocating comprises, upon an occurrence of a first event associated with a failure in the public land mobile network, permitting the first radio terminal to use both the dedicated radio resource and the shared radio resource,
    wherein said allocating comprises, upon an occurrence of a second event that is not associated with the failure, permitting the first radio terminal to use the dedicated radio resource for the ProSe communication within the terminal group but not permitting the first radio terminal to use the shared radio resource.

2. The method according to claim 1, wherein said permitting comprises transmitting first configuration information to the first radio terminal in response to the first event, the first configuration information including allocation of the dedicated radio resource for the ProSe communication within the terminal group and allocation of the shared radio resource for the ProSe communication between a radio terminal belonging to the terminal group and a radio terminal that does not belong to the terminal group.

3. The method according to claim 2, further comprising transmitting second configuration information to the first radio terminal in response to the second event that is not associated with the failure, the second configuration information including the allocation of the dedicated radio resource but not including the allocation of the shared radio resource.

4. The method according to claim 2, wherein the transmitting the first configuration information comprises transmitting the first configuration information to both the first radio terminal and the second radio terminal, the first radio terminal using a first cell in the public land mobile network, the second radio terminal using a second cell located peripherally to the first cell.

5. The method according to claim 1, wherein the first event includes: detection of the failure or performance deterioration in the public land mobile network; reception of a message indicating an occurrence of the failure in the public land mobile network or a warning thereof; or reception of a message indicating an occurrence of a disaster in an area where the public land mobile network is located or a warning thereof.

6. The method according to claim 1, wherein the control apparatus is located in a base station in the public land mobile network.

7. The method according to claim 1, wherein
    the public land mobile network includes a radio access network and a core network, and
    the control apparatus is adapted to communicate with the radio terminals through the radio access network and the core network.

8. A control apparatus comprising:
    at least one non-transitory memory that stores a set of instructions; and
    at least one processor configured to execute the set of instructions to:
    allocate a dedicated radio resource to a first radio terminal for Proximity Service (ProSe) communication performed within a terminal group including the first radio terminal and a second radio terminal without communicating through a public land mobile network; and
    allocate a shared radio resource to the first radio terminal for ProSe communication performed between the first radio terminal and a third radio terminal that does not belong to the terminal group,
    wherein the set of instructions causes the at least one processor, upon an occurrence of a first event associated with a failure in the public land mobile network, to permit the first radio terminal to use both the dedicated radio resource and the shared radio resource,
    wherein the set of instructions causes the at least one processor, upon an occurrence of a second event that is not associated with the failure, to permit the first radio terminal to use the dedicated radio resource for the ProSe communication within the terminal group but not permitting the first radio terminal to use the shared radio resource.

9. The control apparatus according to claim 8, wherein the set of instructions causes the at least one processor, in order to permit the first radio terminal to use radio resources for ProSe communication, to transmit first configuration information to the first radio terminal in response to the first event, the first configuration information including allocation of the dedicated radio resource for the ProSe communication within the terminal group and allocation of the shared radio resource for the ProSe communication between a radio terminal belonging to the terminal group and a radio terminal that does not belong to the terminal group.

10. The control apparatus according to claim 9, wherein the set of instructions further causes the at least one processor to transmit second configuration information to the first radio terminal in response to the second event that is not associated with the failure, the second configuration information including the allocation of the dedicated radio resource but not including the allocation of the shared radio resource.

11. The control apparatus according to claim 9, wherein the set of instructions causes the at least one processor to transmit the first configuration information to both the first radio terminal and the second radio terminal, the first radio terminal using a first cell in the public land mobile network, the second radio terminal using a second cell located peripherally to the first cell.

12. The control apparatus according claim 8, wherein the first event includes: detection of the failure or performance deterioration in the public land mobile network; reception of a message indicating an occurrence of the failure in the public land mobile network or a warning thereof; or reception of a message indicating an occurrence of a disaster in an area where the public land mobile network is located or a warning thereof.

13. The control apparatus according to claim 8, wherein the control apparatus is located in a base station in the public land mobile network.

14. The control apparatus according to claim 8, wherein
the public land mobile network includes a radio access network and a core network, and
the control apparatus is adapted to communicate with the radio terminals through the radio access network and the core network.

15. The control apparatus according to claim 8, wherein the dedicated radio resource and the shared radio resource are included in a frequency band licensed to the public land mobile network.

16. A non-transitory computer readable medium storing a program for causing a computer to perform a method, the method comprising:
allocating a dedicated radio resource to a first radio terminal for Proximity Service (ProSe) communication performed within a terminal group including the first radio terminal and a second radio terminal without communicating through a public land mobile network; and
allocating a shared radio resource to the first radio terminal for ProSe communication performed between the first radio terminal and a third radio terminal that does not belong to the terminal group,
wherein said allocating comprises, upon an occurrence of a first event associated with a failure in the public land mobile network, permitting the first radio terminal to use both the dedicated radio resource and the shared radio resource,
wherein said allocating comprises, upon an occurrence of a second event that is not associated with the failure, permitting the first radio terminal to use the dedicated radio resource for the ProSe communication within the terminal group but not permitting the first radio terminal to use the shared radio resource.

* * * * *